(12) United States Patent
Klubertanz et al.

(10) Patent No.: US 11,003,167 B2
(45) Date of Patent: May 11, 2021

(54) METHOD AND APPARATUS FOR DISTRIBUTION DEVICE REFILL PLANNING

(71) Applicant: Topcon Positioning Systems, Inc., Livermore, CA (US)

(72) Inventors: Kevin Klubertanz, Fort Atkinson, WI (US); Jerome A. Bump, Fort Atkinson, WI (US)

(73) Assignee: TOPCON POSITIONING SYSTEMS, INC., Livermore, CA (US)

( * ) Notice: Subject to any disclaimer, the term of this patent is extended or adjusted under 35 U.S.C. 154(b) by 0 days.

(21) Appl. No.: 15/934,401

(22) Filed: Mar. 23, 2018

(65) Prior Publication Data

US 2019/0294150 A1  Sep. 26, 2019

(51) Int. Cl.
*G06F 7/00* (2006.01)
*G05B 19/414* (2006.01)
*A01C 7/08* (2006.01)
*G06F 1/3225* (2019.01)
*A01C 15/00* (2006.01)
*B60P 1/00* (2006.01)
*A01B 79/00* (2006.01)
(Continued)

(52) U.S. Cl.
CPC ........ *G05B 19/4141* (2013.01); *A01B 69/008* (2013.01); *A01B 79/005* (2013.01); *A01C 7/082* (2013.01); *A01C 15/006* (2013.01); *B60P 1/00* (2013.01); *G06F 1/3225* (2013.01); *A01M 7/0089* (2013.01); *G05B 2219/13153* (2013.01); *G11B 2020/10944* (2013.01)

(58) Field of Classification Search
CPC ...... G05B 19/4141; G05B 2219/13153; A01B 79/005; A01B 69/008; A01C 7/082; A01C 15/006; G06F 1/3225; G11B 2020/10944; A01M 7/0089
See application file for complete search history.

(56) References Cited

U.S. PATENT DOCUMENTS

| 2011/0098851 A1* | 4/2011 | Glendenning | A01C 7/046 700/240 |
| 2014/0165890 A1* | 6/2014 | Graham | A01C 7/04 111/170 |

(Continued)

FOREIGN PATENT DOCUMENTS

| WO | 2011045650 A2 | 4/2011 | |
| WO | WO-2011045650 A2 * | 4/2011 | ........... A01B 69/008 |

(Continued)

OTHER PUBLICATIONS

International Search Report and Written Opinion dated Jun. 24, 2019, in connection with International Patent Application No. PCT/US2019/022023, 13 pgs.

*Primary Examiner* — Yolanda R Cumbess
(74) *Attorney, Agent, or Firm* — Chiesa Shahinian & Giantomasi PC

(57) ABSTRACT

A method for agricultural refill planning determines a refill time and access point for a mobile storage device (e.g., a seed tender) to refill an agricultural distribution device (e.g., planter) with agricultural material (e.g., seed). The refill time and access point are selected so that excess time is not lost and areas, such as planting fields, are not adversely affected by movement of the agricultural distribution device or the mobile storage device.

16 Claims, 7 Drawing Sheets

(51) Int. Cl.
*A01B 69/04* (2006.01)
*A01M 7/00* (2006.01)
*G11B 20/10* (2006.01)

(56) References Cited

U.S. PATENT DOCUMENTS

2014/0165891 A1* 6/2014 Garner .................... A01C 7/08
 111/170
2016/0278277 A1* 9/2016 V lberg ................ A01C 21/005
2018/0084711 A1* 3/2018 Gresch ................. A01C 15/003
2020/0324985 A1* 10/2020 Posselius ............. A01C 23/045

FOREIGN PATENT DOCUMENTS

WO    2017205218 A1    11/2017
WO    WO-2017205218 A1 *    11/2017    ........... A01C 15/003

* cited by examiner

US 11,003,167 B2

METHOD AND APPARATUS FOR DISTRIBUTION DEVICE REFILL PLANNING

BACKGROUND

The present disclosure relates generally to the application of agricultural materials, and more particularly to agricultural distribution device refill planning.

Agricultural distribution devices (e.g., planters) have one or more storage carriers for holding agricultural materials (e.g., seed) that are to be distributed in a desired area. A storage carrier of an agricultural distribution device has a fixed volume and is required to be refilled as material is distributed and the material in the storage carrier is depleted. The storage carriers of the agricultural distribution device can be refilled with agricultural material from a mobile storage device (e.g., a seed tender). When an agricultural distribution device depletes material in its storage carriers, the agricultural distribution device is refilled with material from a hopper of the mobile storage device.

The agricultural distribution device can be moved to the mobile storage device or vice versa for refilling. The agricultural distribution device and mobile storage device can also both be moved to a particular location for refilling. However, time that could be spent distributing material is lost when an empty agricultural distribution device has to travel to an area to be refilled by the mobile storage device. Also, areas, such as planting fields, can be adversely affected by a mobile storage device travelling over the fields.

A known method for Agricultural Rate Management described in U.S. Pat. No. 9,338,938 provides automatic management of agricultural rates for planting, application, harvesting, or similar tasks. In one scenario, an operator of a sprayer for applying fertilizer to crops in a field would like to run out of fertilizer at a desired location along a path of the sprayer. An autopilot of the sprayer estimates the quantity of fertilizer in the sprayer, the rate at which the fertilizer is being dispensed, and the time remaining to the desired location along the path. The autopilot then adjusts the dispensing rate such that the fertilizer runs out at the desired location. Disadvantageously, adjustment of the dispensing rate can result in too much or not enough fertilizer being applied to the crops.

SUMMARY

A method for agricultural refill planning determines a refill time and access point for a mobile storage device to refill an agricultural distribution device with agricultural material. The refill time and access point are selected so that excess time is not lost and areas, such as planting fields, are not adversely affected by movement of the agricultural distribution device or the mobile storage device.

In one embodiment, the method includes the steps of determining a time and a location along a planned path of an agricultural distribution device at which agricultural material in a storage carrier of the agricultural distribution device will be depleted. Determining when the agricultural distribution device will deplete the agricultural material located in its storage carriers can be based on an amount of agricultural material in the distribution device, the planned path, and an application rate of the agricultural distribution device.

One of a plurality of access points for the agricultural distribution device and the mobile storage carrier to meet is selected based on the time and the location at which material in a storage carrier of the agricultural distribution device will be depleted. The selected access point, in one embodiment, is located between a starting point of the planned path and the location at which material in a storage carrier of the agricultural distribution device will be depleted. In one embodiment, the selected access point is located along the planned path of the agricultural distribution device. The access point can encompass a portion of the planned path and an area accessible by the mobile storage device. A refill time for the agricultural distribution device and a mobile storage carrier to meet at the selected access point is determined. An identification of the selected access point and the refill time are transmitted to the agricultural device and the mobile storage device.

Data from the agricultural distribution device representing the amount of agricultural material located in the storage carriers of the agricultural distribution device and an application rate can be transmitted from the agricultural distribution device to a planning computer that is also in communication with the mobile storage device. The amount of agricultural material located in the agricultural distribution device can be based on a volume or weight of the agricultural material.

An amount of agricultural material to be transferred from the mobile storage device to the agricultural distribution device can be determined based on the planned path and application rate of the agricultural distribution device. In one embodiment, a refill time at which the agricultural distribution device and mobile storage device should meet at the access point is determined based on the planned path of the agricultural distribution device.

DETAILED DESCRIPTION

A method and apparatus for agricultural distribution device refill planning detects an amount of material in storage carriers of a distribution machine such as a planter. The amount of material required to be applied to an area, such as a field, is also determined. If the amount of material required to be applied is greater than the amount of material in the storage containers, then a time and place for a refill of material from a mobile storage device (e.g., a seed tender) is determined. A time at which refilling of an agricultural distribution device takes place is referred to as a refill time. A place where refilling of an agricultural distribution device takes place is referred to as an access point. An access point, in one embodiment, is an area that includes a portion of a field in which the agricultural distribution device is applying agricultural material and a portion of an area outside of the field, such as a portion of a road along a side of the field accessible by the mobile storage device. A refill time and an access point at which the agricultural distribution device and the mobile storage device are to meet are determined by a planning computer and transmitted to the mobile storage device and the agricultural distribution device.

Figure 1:
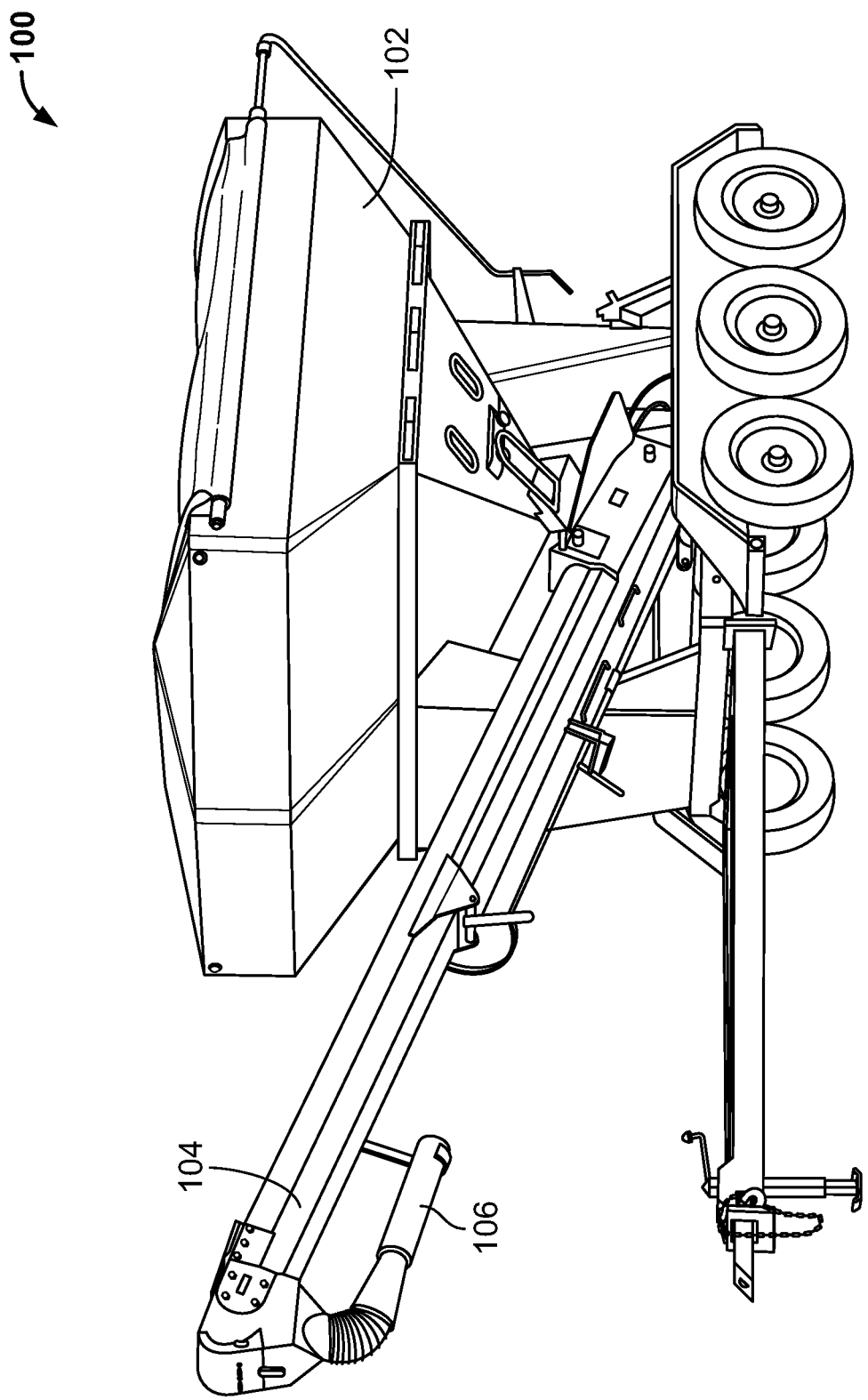
FIG. 1 shows a mobile storage device for carrying material.

FIG. 1 shows a mobile storage device 100 comprising a hopper 102 and a boom 104 for transferring material. A flexible distribution nozzle 106 is located at a discharge end of boom 104 which allows a user to direct material discharged from mobile storage device 100. In one embodiment, hopper 102 has a discharge door (not shown) which is opened to allow material to flow from hopper 102 to a receiving end of boom 104. Boom 104 comprises one or more of an auger, conveyor or other device for moving material from the receiving end of boom 104 to the discharge end of boom 104. Mobile storage device 100 (e.g., a seed tender) can be used to fill or refill another machine with material, such as an agricultural distribution device (e.g., a planter).

Figure 2:
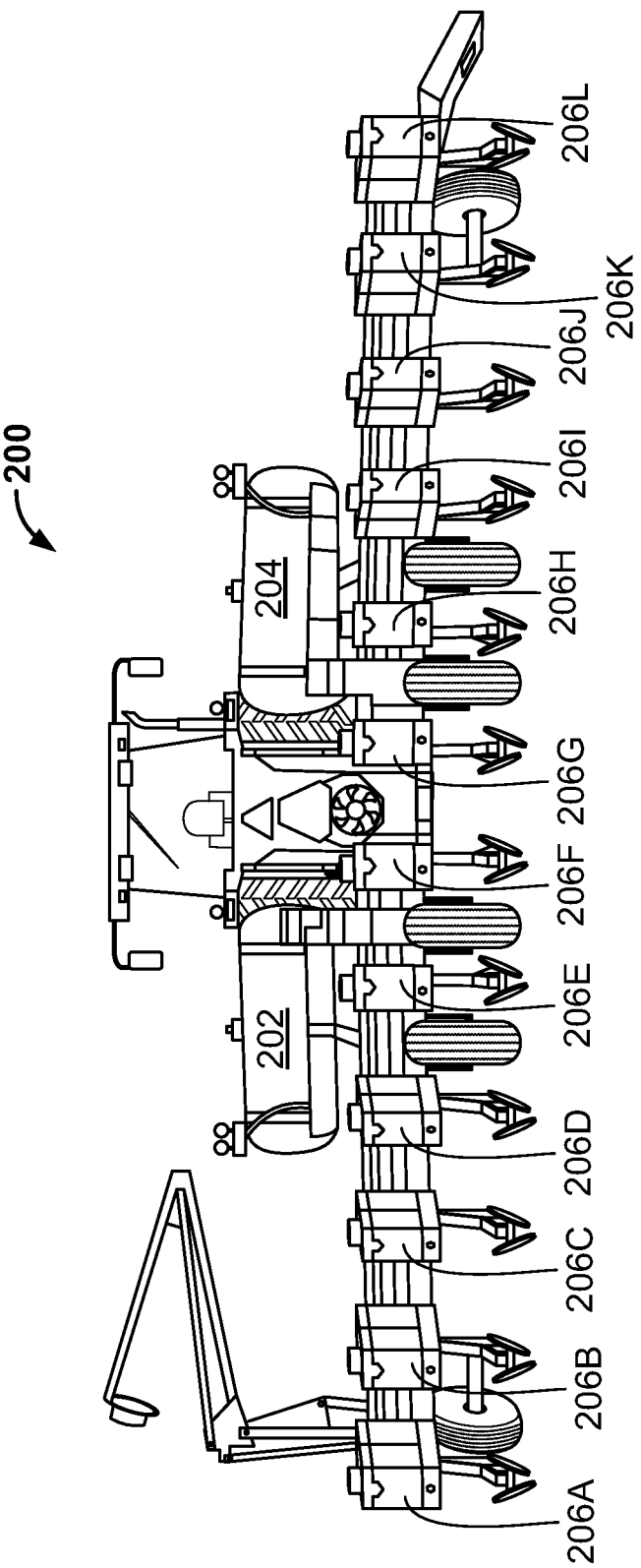
FIG. 2 shows an agricultural distribution device.

FIG. 2 shows agricultural distribution device 200 which, in this example, is a planter comprising storage carriers 202, 204, and a plurality of application devices 206A-206L. Material, such as seed for planting is loaded into storage carriers 202, 204 and distributed to a surface such as a field via application devices 206A-206L.

Both agricultural distribution device 200 and mobile storage device 100 have measuring devices on board in order to determine the amount of agricultural material they currently carry. Agricultural distribution device 200 may also use on-board measuring devices to measure an application rate of material. Agricultural distribution device 200 is filled with agricultural material in order to apply that material to an area or part of an area. As agricultural distribution device 200 travels along a planned path, material is depleted from storage carriers 202, 204 as the material is applied to the area. Material application process efficiency is increased if agricultural distribution device does not deplete all of the agricultural material located in storage carriers 202, 204 before reaching an end or side of an area. For example, if the agricultural material in storage carriers 202, 204 of agricultural distribution device 200 is depleted when it is located in the middle of a field, it has to travel to a location where it can receive additional agricultural material from mobile storage device 100. Movement of agricultural distribution device 200 without the distribution of material wastes time and money. Use of an access point as a location for refilling agricultural distribution device 200 prevents mobile storage device 100 from having to be moved over the field and possibly adversely affecting the field by compacting the surface of the field or damaging crops as it travels. An access point and a refill time can be determined in order to reduce the chances of unnecessary trips or travel across the field by either machine.

In order to increase efficiency of the operation of agricultural distribution device 200, a refill time and an access point at which it can be refilled with material from mobile storage device 100 are determined. The refill time and access point for refilling, in one embodiment, is based on information including when, where, and how much additional agricultural material is needed to be loaded into agricultural distribution device 200. This information can be used to direct mobile storage device 100 and agricultural distribution device 200 to a selected access point at a determined refill time.

It is desirable to load agricultural distribution device 200 with agricultural material from mobile storage device 100 at an access point. In one embodiment, a planning computer (shown in FIG. 3) coordinates the access point and refill time at which mobile storage device 100 loads material into agricultural distribution device 200. When multiple agricultural distribution devices are serviced by a single mobile storage device, having updated information pertaining to where and when each agricultural distribution device is needed to be located for refill based on an algorithm executed by a planning computer can aid in coordinating activities for efficient utilization of equipment.

Figure 3:
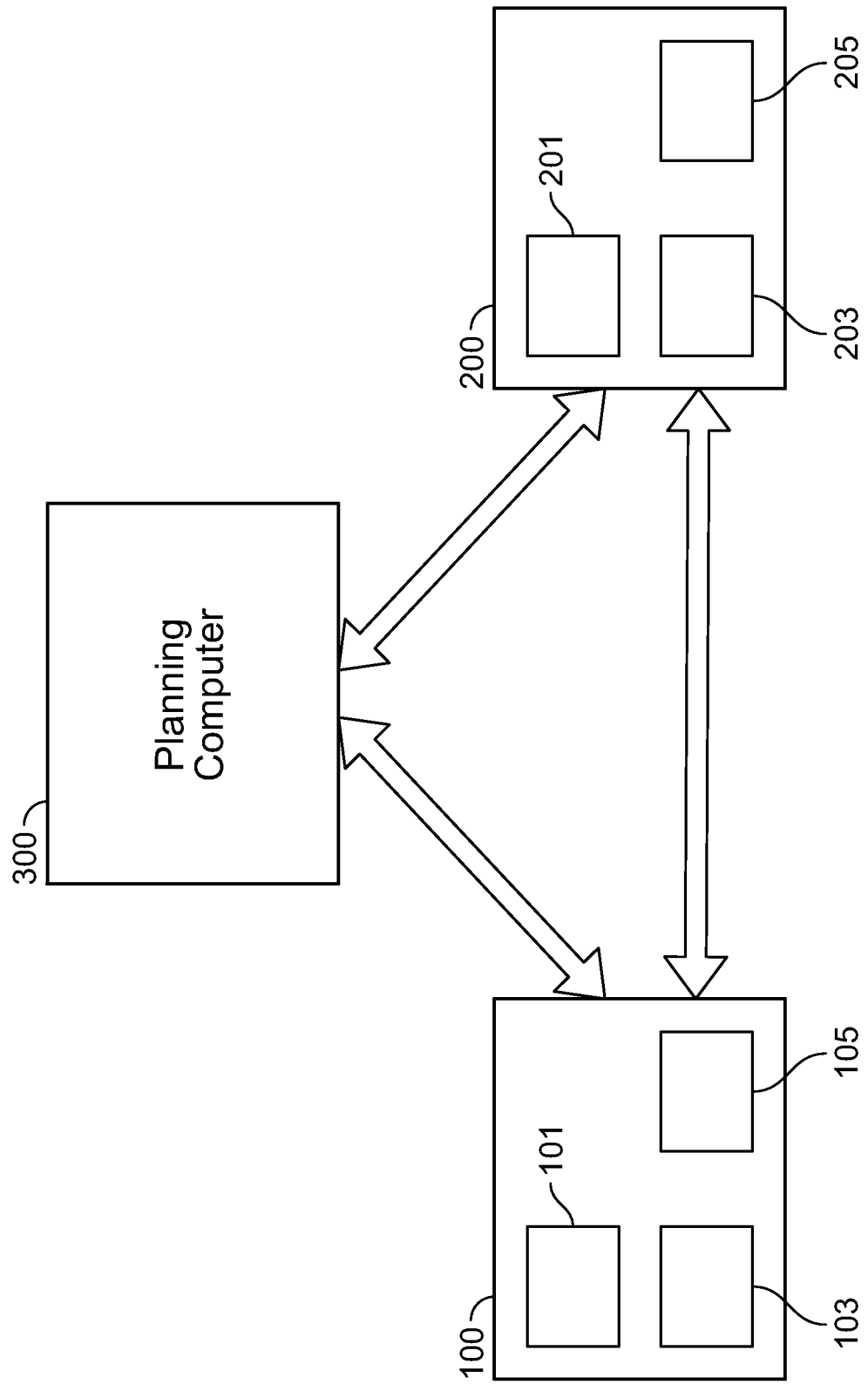
FIG. 3 shows a system for distribution device refill planning.

FIG. 3 shows a system for distribution device refill planning comprising mobile storage device 100, agricultural distribution device 200 and planning computer 300. As shown in FIG. 3, arrows between mobile storage device 100, agricultural distribution device 200, and planning computer 300 represent communication among the devices and the computer. In one embodiment, mobile storage device 100, agricultural distribution device 200, and planning computer 300 communicate wirelessly using radio frequency communication. In one embodiment, sensors 105, 205 located on mobile storage device 100 and agricultural distribution device 200, respectively, communicate with their respective controllers 101, 201. The sensors, for example, can be used to detect a volume, weight, density, variety, and maturity of the material in mobile storage device 100 and/or agricultural distribution device 201 and transmit data to the respective controller. Global Navigation Satellite System (GNSS) receivers 103, 203 are also in communication with their respective controllers 101, 201. Controllers 101, 201 of mobile storage device 100 and agricultural distribution device 200, respectively, can transmit sensor and location data to planning computer 300. In one embodiment, sensor and location data is collected by controllers 101, 201 and periodically transmitted to planning computer 300. Controllers 101, 201 can also transmit sensor and location data in real time to planning computer 300. Planning computer 300 uses the sensor and location data along with planned path information to determine when and where one or more agricultural distribution devices will need to be refilled with agricultural material.

Planning computer 300 is located remote from and communicates with mobile storage device 100 and agricultural distribution device 200. In one embodiment, planning computer 300 is located so that multiple mobile storage devices and agricultural distribution devices are in wireless communication with planning computer 300. For example, on a relatively large farm, planning computer is located near the center of the farm so that machines in different fields of the farm can communicate with planning computer 300. In one embodiment, one or more receivers located in different areas of the farm can receive information from machines and transmit that information to planning computer 300.

Figure 4:
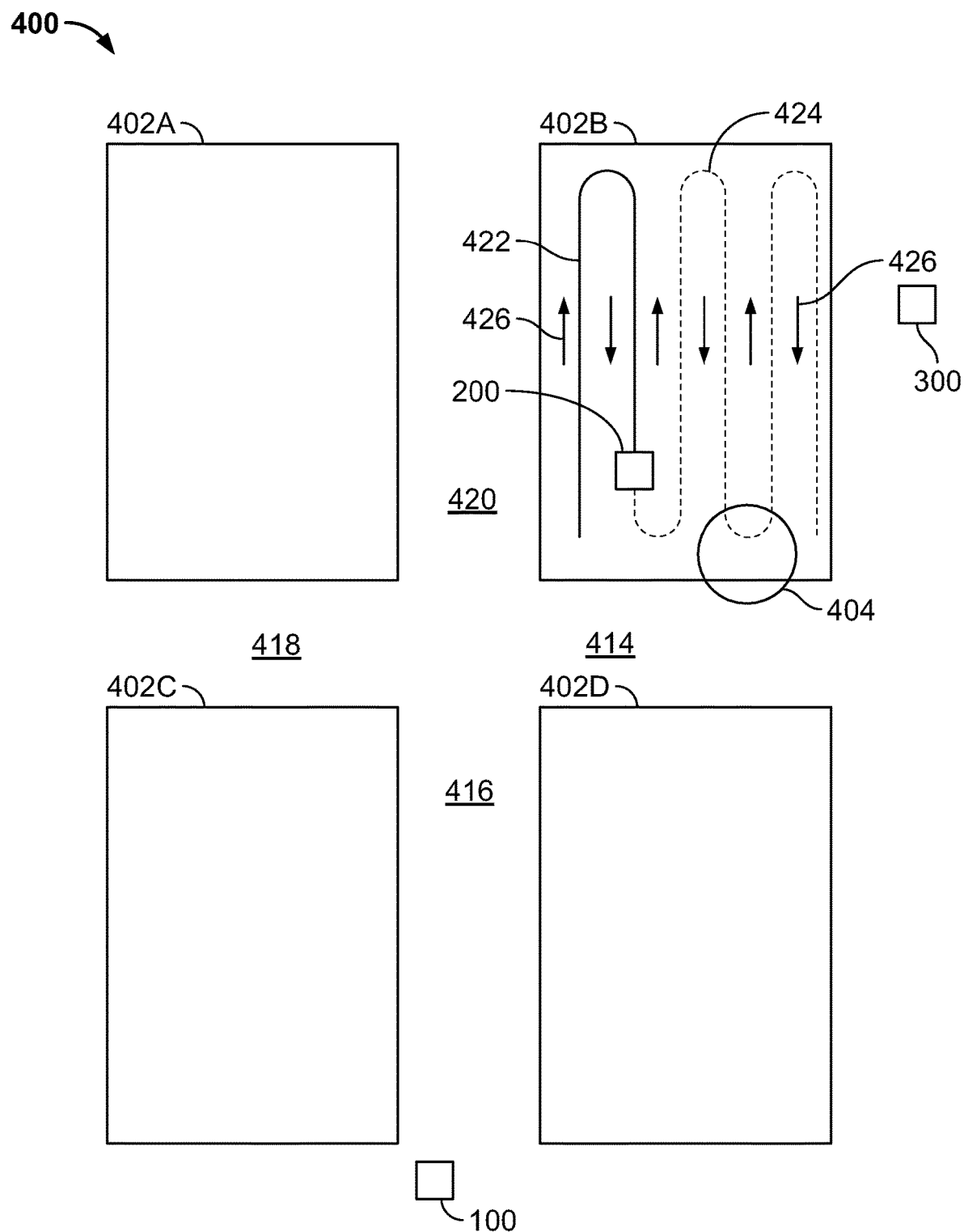
FIG. 4 shows farming fields in which a mobile storage device and an agricultural distribution device are located with a planning computer located within communication range.

FIG. 4 shows an area 400 containing four fields 402A, 402B, 402C, 402D separated by access roads 414, 416, 418, 420. In this example, seeds are to be planted in fields 402A, 402B, 402C, 402D by agricultural distribution device 200. In this example, agricultural distribution device 200 has already planted seeds in field 402D and is currently planting seed in field 402B. Path traversed 422 is the portion of planned path agricultural distribution device 200 has traveled and is shown as a solid line. Path to be traversed 424 is the portion of the planned path agricultural distribution device 200 has not yet travelled and is shown as a dashed line. Arrows 426 show the direction of travel of agricultural distribution device 200 along portions of the planned path.

It has been determined that agricultural distribution device 200 does not have enough seed to finish planting seed in field 402B. Based on data from agricultural distribution device 200 and mobile storage device 100, planning computer 300 has determined that agricultural distribution device 200 and mobile storage carrier 100 should meet at access point 404 at a specific refill time.

Figure 5:
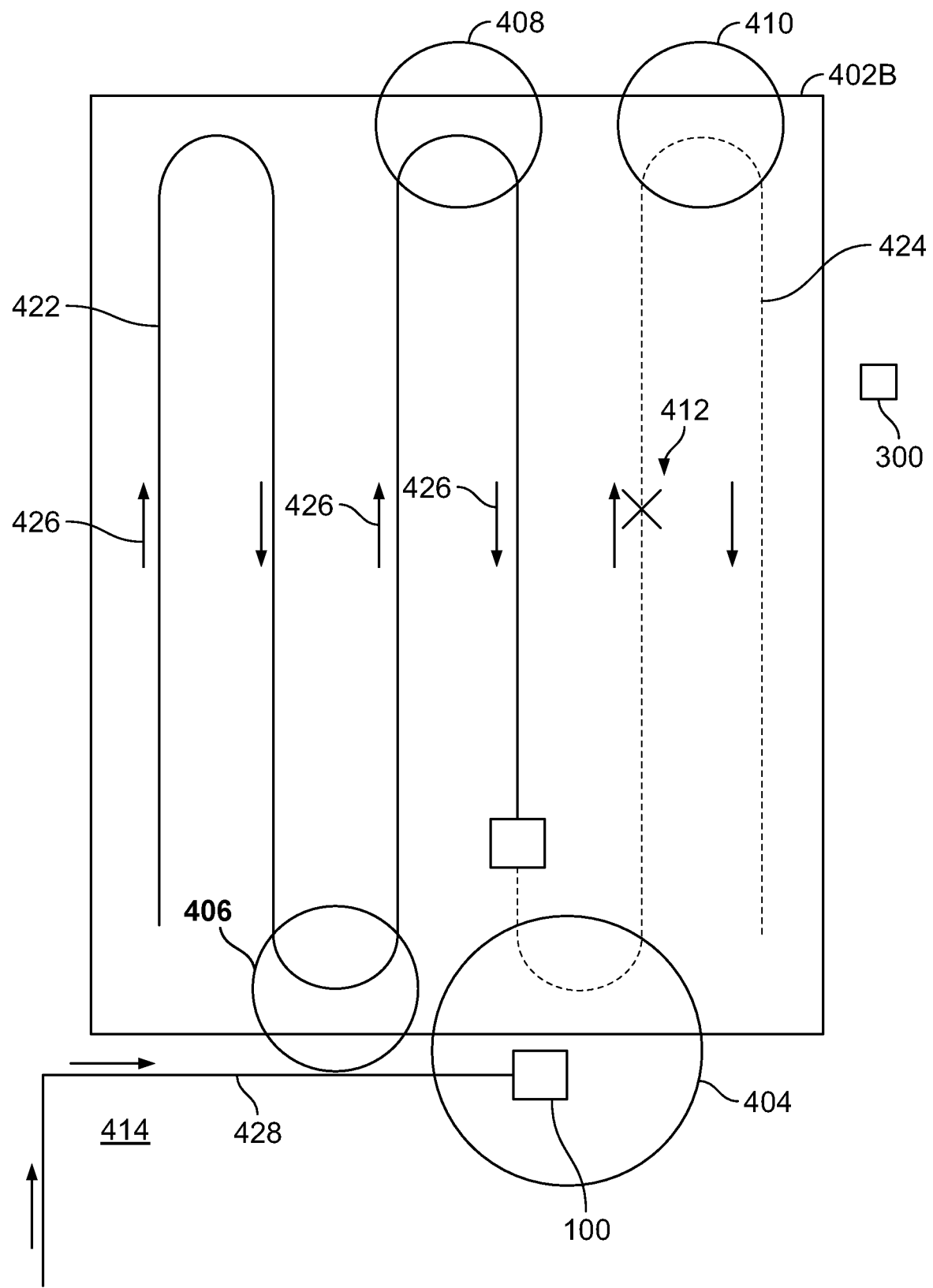
FIG. 5 shows an agricultural distribution device approaching a mobile storage device located at an access point.

FIG. 5 shows mobile storage device 100 at access point 404 where it can load agricultural material into agricultural distribution device 200. Access point 404 shown in FIG. 5 has been selected from access points 404, 406, 408, and 410 based on when and where agricultural distribution device 200 is predicted to deplete the agricultural material in storage carriers 202,204. An access point, in one embodiment, is an area in which agricultural distribution device 200 and mobile storage device are located for refilling storage carriers 202, 204. An access point can be located along a planned path of agricultural distribution device 200. An access point can encompass a planned path of agricultural distribution device 200 and a portion of an area accessible by mobile storage device 100, such as an access road, adjacent to a field in which agricultural distribution device 200 is operating.

The location where agricultural distribution device 200 is expected to be when it depletes the material in storage carriers 202,204 is determined by planning computer 300 and is identified FIG. 5 by the "X" labelled 412. In one embodiment, the location where agricultural distribution device will deplete the material in storage carriers 202,204 is based on an amount of material in storage carriers 202, 204, an application rate of the agricultural distribution device 200, and the planned path of the agricultural distribution device. The planned path is a path along which agricultural distribution device 200 will travel. The planned path can be a new path entered by a user into controller 201 of agricultural distribution device 200 or an existing planned path stored in planning computer 300. In one embodiment, existing planned paths are generated based on prior paths agricultural distribution device has traversed fields based on position data from controller 201.

For example, if storage carriers 202,204 contain 10,000 pounds of agricultural material and agricultural distribution device is applying the agricultural material at a rate of 1 pound per foot travelled, agricultural distribution device will deplete the material in storage carriers 202,204 after travelling 10000 feet. Since agricultural distribution device is travelling along a planned path, it can be determined where along the planned path the material in storage carriers 202,204 will be depleted.

The time at which the material in storage carriers 202, 204 will be depleted can be determined by dividing the distance agricultural distribution device 200 can travel before depleting the agricultural material in storage carriers 202,204 by the speed at which the agricultural distribution device is travelling. For example, 10,000 feet divided by a speed of 1 foot per second equals 10,000 seconds (approximately 167 minutes).

Access point 404 is selected from access points 404, 406, 408, 410 based on the location where agricultural distribution device 200 will deplete the material in storage carriers 202, 204 (i.e., the "X" labelled 412 in FIG. 5). As shown in FIG. 5, the agricultural distribution device is expected to deplete the agricultural material in storage carriers 202, 204 at approximately the middle of its fifth pass of field 402B. As such, agricultural distribution device 200 will need to be refilled before it reaches access point 410. Access point 404 is the last access point along the planned path that agricultural distribution device 200 will arrive at before it depletes the agricultural material in storage carriers 202, 204. Thus, access point 404 is selected as the location at which agricultural distribution device 200 and mobile storage device 100 will meet to refill storage carriers 202,204. Mobile storage device 100 travels along access road 414 to access point 404 as shown by mobile storage device path 428. Mobile storage device 100 will load agricultural distribution device 200 with an amount of seed based on various factors such as the amount of seed required to finish field 402B and/or additional fields.

In one embodiment, the refill time at which mobile storage device 100 and agricultural distribution device 200 should meet at a selected access point is determined based on when agricultural distribution device 200 will arrive at the selected access point and whether mobile storage device 100 will be available. For example, an access point located along a planned path immediately prior to a location where agricultural distribution device 200 will deplete the material in storage carriers 202,204 may be selected and a time at which agricultural distribution device 200 will arrive at the selected access point will be determined. If mobile storage device 100 is available to meet at the selected access point at the determined time, then the selected access point and time are acceptable. If mobile storage carrier 100 is not available at the determined time, an alternative access point at which agricultural distribution device 200 will arrive before the selected access point along the planned path is determined and the time at which agricultural distribution device 200 will arrive at the alternative access point is determined. If mobile storage carrier 100 is available at the alternative time, then the alternative access point and alternative time are selected. If mobile storage carrier 100 is not available at the alternative time, then the process of selecting an alternative access point continues as described above until an alternative access point and time are selected.

Figure 6:
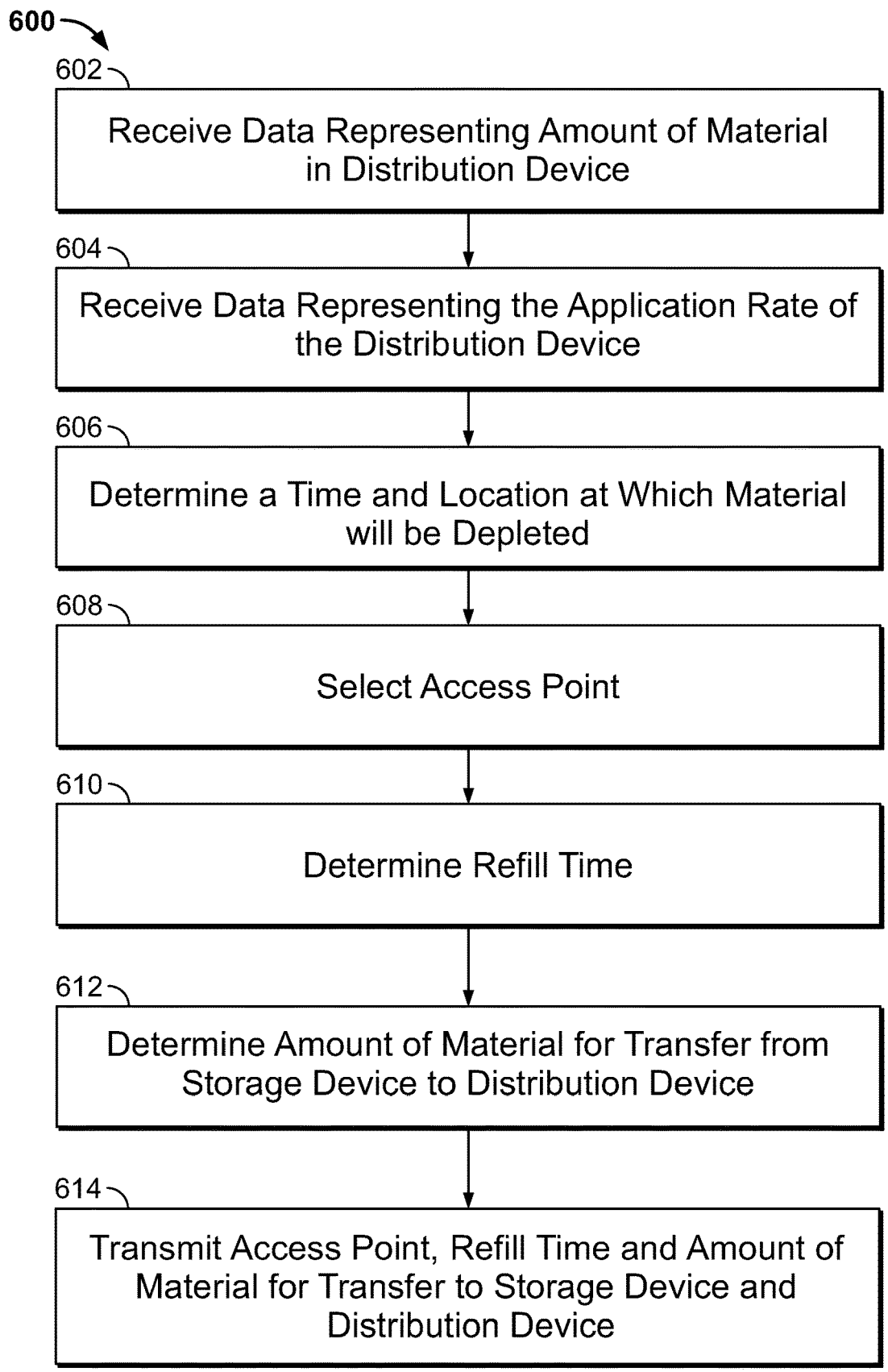
FIG. 6 shows a flowchart of a method for agricultural distribution device refill planning according to an embodiment.

FIG. 6 shows a flow chart 600 of a method for distribution device refill planning according to one embodiment. At step 602, data representing an amount of agricultural material in agricultural distribution device 200 is received by planning computer 300. The amount of agricultural material in agricultural distribution device 200 can be determined using sensors 205 located on agricultural distribution device 200. In one embodiment, sensors 205 located on the agricultural distribution device can determine a volume and/or weight of material located in agricultural distribution device 200. At step 604, data representing an application rate of agricultural material of agricultural distribution device 200 is received by planning computer 300. The application rate can be in various units such as weight or volume of material per square foot, distance travelled by agricultural distribution device 200, etc. It should be noted that a speed of the agricultural distribution device 200 and its application rate can vary over the planned path. In one embodiment, a varying speed and application rate are taken into account in planning when an agricultural distribution device needs to be refilled.

In one embodiment, data representing an amount of agricultural material in agricultural distribution device 200 and data representing an application rate of the agricultural material can be received in real-time by planning computer 300. For example, in one embodiment, a volume and/or weight of agricultural material located in agricultural distribution device 200 is determined by sensors 205 and transmitted to planning computer 300. This allows the volume and/or weight of agricultural material located in agricultural distribution device 200 to be calculated. Real time or periodic calculation of the volume and/or weight of the agricultural material provides many benefits over estimation. For example, real time or periodic calculation allows for more accurate determination of when various events should occur such as when the agricultural distribution device will need to be refilled.

At step 606, planning computer 300 determines a time and location along a planned path of agricultural distribution device 200 when agricultural distribution device 200 will deplete the agricultural material in storage carriers 202, 204. In one embodiment, determining the time and location the agricultural distribution device 200 will deplete the agricultural material is based on the amount of agricultural material in agricultural distribution device 200, the planned path of agricultural distribution device 200, the speed of agricultural distribution device 200, and the application rate of agricultural material of agricultural distribution device 200.

At step 608, an access point (e.g., access point 404 of FIGS. 4 and 5) is selected from multiple access points 404, 406, 408, 410. The access point selected is based on the time and location along the planned path of agricultural distribution device 200 at which material in storage carriers 202,204 will be depleted.

In one embodiment, the particular access point is chosen to be an access point that agricultural distribution device 200 will arrive at before depleting the agricultural material in its storage carriers 202, 204. In one embodiment, the selected access point is located between a starting point of the planned path and the location at which material in the storage carrier of the agricultural distribution device will be depleted. The particular access point selected can also be chosen based when mobile storage device 100 will be available (i.e., not currently travelling or refilling other distribution devices).

At step 610, a refill time for mobile storage device 100 and agricultural distribution device 200 to be at access point 404 is determined. In one embodiment, the refill time is determined based on the planned path of agricultural distribution device 200, a travel speed of agricultural distribution device 200, and the availability of mobile storage device 100. It should be noted that mobile storage device 100 and agricultural distribution device 200 can arrive at different times. For example, mobile storage device 100 can arrive at an identified access point earlier than the agricultural distribution device in order to provide an operator with time to prepare for the transfer of agricultural material. Agricultural distribution device 200 may arrive at access point 404 earlier than mobile storage device 100.

At step 612, an amount of agricultural material to be transferred from mobile storage device 100 to agricultural distribution device 200 is determined. In one embodiment, the amount of agricultural material to be transferred to agricultural distribution device 200 is based on the planned path and application rate of agricultural distribution device 200.

At step 614, data representing the access point, refill time, and the amount of material to be transferred are transmitted from planning computer 300 to mobile storage device 100 and agricultural distribution device 200.

Specifications of material, such as seed, loaded into mobile storage device 100 and agricultural distribution device 200 can be identified and stored by planning computer 300. In one embodiment, a bar code associated with the material to be loaded into a machine is scanned by a user and the information is transmitted to planning computer 300 where it is stored along with additional related information such as date/time, location, etc.

Multiple agricultural distribution devices can be supported by a single mobile storage device. In one embodiment, refilling of each agricultural distribution device is further based on availability of the mobile storage device servicing multiple agricultural distribution devices. For example, refilling of agricultural distribution devices can be prioritized and/or optimized based on the location of each distribution device, when each agricultural distribution device is expected to run out of seed, and the location and travel time of the mobile storage device.

Transfer of material from mobile storage device 100 to agricultural distribution device 200 can be recorded. In one embodiment, user input to a controller of one of the agricultural distribution device 200 or mobile storage device 100 causes data to be transmitted to the planning computer and stored. The distribution of material can also be automatically transmitted from mobile storage device 100 or agricultural distribution device 200 to planning computer 300 for storage.

In one embodiment, field data, including area, type of material to be applied, and planned path is stored by planning computer 300. The field data is used to determine approximately when distribution devices will run out of material. In one embodiment, data is transmitted from agricultural distribution device 200 to planning computer 300 concerning actual application of material including an actual application rate and an actual path. Differences between planned path and application rates and actual path and application rates can be used to modify the time and location when refilling is planned to occur.

Figure 7:
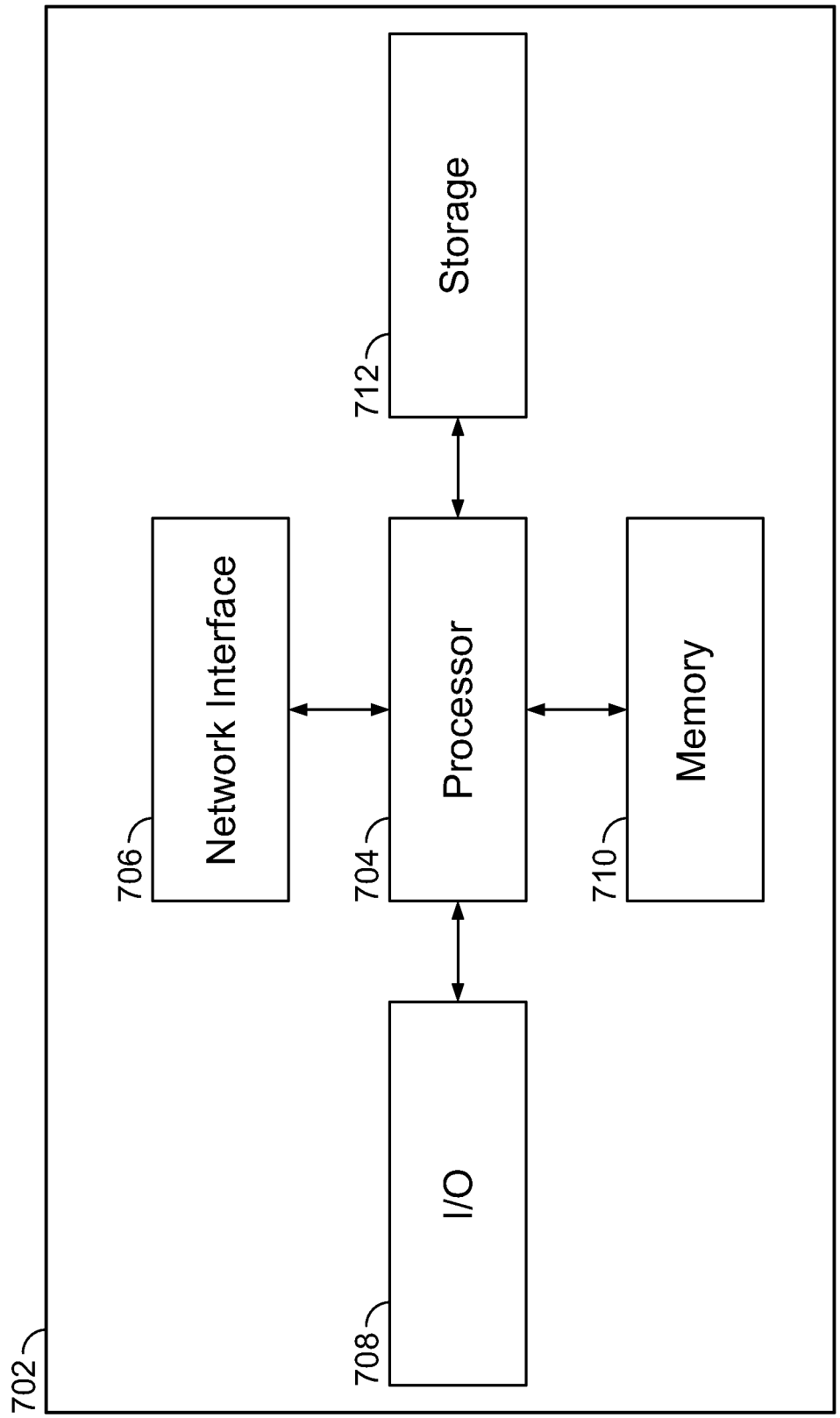
FIG. 7 shows a high-level block diagram of a computer capable of implementing a planning computer and/or a controller for an agricultural distribution device or mobile storage device.

In one embodiment, planning computer 300 and controllers 101, 201 located on mobile storage device 100 and agricultural distribution device 200 can be implemented using computers. A high-level block diagram of such a computer is illustrated in FIG. 7. Computer 702 contains a processor 704 which controls the overall operation of the computer 702 by executing computer program instructions which define such operation. The computer program instructions may be stored in a storage device 712, or other computer readable medium (e.g., magnetic disk, CD ROM, etc.), and loaded into memory 710 when execution of the computer program instructions is desired. Thus, the method steps of FIG. 6 can be defined by the computer program instructions stored in the memory 710 and/or storage 712 and controlled by the processor 704 of planning computer 300 executing the computer program instructions. For example, the computer program instructions can be implemented as computer executable code on planning computer 300 programmed by one skilled in the art to perform an algorithm defined by the method steps of FIG. 6. Accordingly, by executing the computer program instructions, the processor 704 of planning computer 300 executes an algorithm defined by the method steps of FIG. 6. Processors of controllers 101,201 can also be configured to execute computer program instructions for executing an algorithm defined by the method steps of FIG. 6. The computer 702 also includes one or more network interfaces 706 for communicating with other devices via a network. The computer 702 also includes input/output devices 708 that enable user interaction with the computer 702 (e.g., display, keyboard, mouse, speakers, buttons, etc.) One skilled in the art will recognize that an implementation of an actual computer could contain other components as well, and that FIG. 7 is a high level representation of some of the components of such a computer for illustrative purposes.

The foregoing Detailed Description is to be understood as being in every respect illustrative and exemplary, but not restrictive, and the scope of the inventive concept disclosed herein is not to be determined from the Detailed Description, but rather from the claims as interpreted according to the full breadth permitted by the patent laws. It is to be understood that the embodiments shown and described herein are only illustrative of the principles of the inventive concept and that various modifications may be implemented by those skilled in the art without departing from the scope and spirit of the inventive concept. Those skilled in the art could implement various other feature combinations without departing from the scope and spirit of the inventive concept.

The invention claimed is:

1. A method for agricultural distribution device refill planning comprising:
   determining a time and a location along a planned path of an agricultural distribution device at which material in a storage carrier of the agricultural distribution device will be depleted;
   selecting one of a plurality of access points based on the time and the location, wherein the selected access point encompasses a portion of the planned path and an area accessible by a mobile storage device;
   determining a refill time for the agricultural distribution device and the mobile storage device to meet at the selected access point;
   determining an amount of material to be transferred from the mobile storage device to the agricultural distribution device based on the planned path and an application rate of the agricultural distribution device; and
   transmitting to the agricultural distribution device and the mobile storage device an identification of the selected access point, the refill time, and the amount of material to be transferred,
   wherein the agricultural distribution device is one of a plurality of agricultural distribution devices serviced by the mobile storage device and the selecting one of the plurality of access points and determining the refill time are based on an availability of the mobile storage device.

2. The method of claim 1, wherein the selected access point is located along the planned path of the agricultural distribution device.

3. The method of claim 1, wherein the selected access point is located between a starting point of the planned path and the location at which material in the storage carrier of the agricultural distribution device will be depleted.

4. The method of claim 1, wherein the determining the time and the location at which material in a storage carrier of the agricultural distribution device will be depleted is based on an amount of material in the agricultural distribution device, the planned path, the application rate of the agricultural distribution device, and a speed of the agricultural distribution device.

5. The method of claim 4, further comprising:
   receiving data from the agricultural distribution device representing the amount of material in the agricultural distribution device;
   receiving data from the agricultural distribution device representing the application rate of the agricultural distribution device; and
   receiving data from the agricultural distribution device representing the speed of the agricultural distribution device.

6. The method of claim 4, wherein the amount of material in the agricultural distribution device is based on one of volume of material or weight of material.

7. The method of claim 4, wherein the application rate and speed of the agricultural distribution device varies over the planned path.

8. The method of claim 1, wherein the planned path is identified by a user.

9. An apparatus comprising:
   a processor; and
   a memory to store computer program instructions, the computer program instructions when executed by the processor cause the processor to perform operations comprising:
   determining a time and a location along a planned path of an agricultural distribution device at which material in a storage carrier of the agricultural distribution device will be depleted;
   selecting one of a plurality of access points based on the time and the location, wherein the selected access point encompasses a portion of the planned path and an area accessible by a mobile storage device;
   determining a refill time for the agricultural distribution device and the mobile storage device to meet at the selected access point;
   determining an amount of material to be transferred from the mobile storage device to the agricultural distribution device based on the planned path and an application rate of the agricultural distribution device; and
   transmitting to the agricultural distribution device and the mobile storage device an identification of the selected access point, the refill time, and the amount of material to be transferred,
   wherein the agricultural distribution device is one of a plurality of agricultural distribution devices serviced by the mobile storage device and the selecting one of the plurality of access points and determining the refill time are based on an availability of the mobile storage device.

10. The apparatus of claim 9, wherein the selected access point is located along the planned path of the agricultural distribution device.

11. The apparatus of claim 9, wherein the selected access point is located between a starting point of the planned path and the location at which material in the storage carrier of the agricultural distribution device will be depleted.

12. The apparatus of claim 9, wherein the determining the time and the location at which material in a storage carrier of the agricultural distribution device will be depleted is based on an amount of material in the agricultural distribution device, the planned path, the application rate of the agricultural distribution device, and a speed of the agricultural distribution device.

13. A computer readable medium storing computer program instructions, which, when executed by a processor, cause the processor to perform operations comprising:
   determining a time and a location along a planned path of an agricultural distribution device at which material in a storage carrier of the agricultural distribution device will be depleted;
   selecting one of a plurality of access points based on the time and the location, wherein the selected access point encompasses a portion of the planned path and an area accessible by a mobile storage device;
   determining a refill time for the agricultural distribution device and the mobile storage device to meet at the selected access point;
   determining an amount of material to be transferred from the mobile storage device to the agricultural distribution device based on the planned path and an application rate of the agricultural distribution device; and transmitting to the agricultural distribution device and the mobile storage device an identification of the selected access point, the refill time, and the amount of material to be transferred, wherein the agricultural distribution device is one of a plurality of agricultural distribution devices serviced by the mobile storage device and the selecting one of the plurality of access points and determining the refill time are based on an availability of the mobile storage device.

14. The computer readable medium of claim 13, wherein the selected access point is located along the planned path of the agricultural distribution device.

15. The computer readable medium of claim 13, wherein the selected access point is located between a starting point of the planned path and the location at which material in the storage carrier of the agricultural distribution device will be depleted.

16. The computer readable medium of claim 13, wherein the determining the time and the location at which material in a storage carrier of the agricultural distribution device will be depleted is based on an amount of material in the agricultural distribution device, the planned path, the application rate of the agricultural distribution device, and a speed of the agricultural distribution device.

* * * * *